US011802475B2

(12) United States Patent
Klenner et al.

(10) Patent No.: US 11,802,475 B2
(45) Date of Patent: Oct. 31, 2023

(54) REAL TIME MONITORING OF FRACTURE DRIVEN INTERFERENCE

(71) Applicant: Baker Hughes Oilfield Operations LLC, Houston, TX (US)

(72) Inventors: Robert Klenner, Oklahoma City, OK (US); Hayley Stephenson, Oklahoma City, OK (US); Thomas Nguyen, Richmond, TX (US); Guoxiang Liu, Edmond, OK (US); Alireza Shahkarami, Oklahoma City, OK (US); Glen Murrell, Edmond, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/033,885

(22) Filed: Sep. 27, 2020

(65) Prior Publication Data

US 2021/0095558 A1   Apr. 1, 2021

Related U.S. Application Data

(60) Provisional application No. 62/907,016, filed on Sep. 27, 2019.

(51) Int. Cl.
*E21B 47/06* (2012.01)
*G01V 9/00* (2006.01)

(52) U.S. Cl.
CPC .............. *E21B 47/06* (2013.01); *G01V 9/00* (2013.01)

(58) Field of Classification Search
CPC ...... E21B 47/06; E21B 2200/22; E21B 43/26; G01V 9/00

USPC ........................................................... 702/11
See application file for complete search history.

(56) References Cited

U.S. PATENT DOCUMENTS

| | | | |
|---|---|---|---|
| 8,532,968 B2 | 9/2013 | Oury et al. | |
| 2013/0333879 A1 | 12/2013 | Rasheed | |
| 2017/0096880 A1 | 4/2017 | Ben et al. | |
| 2018/0142543 A1* | 5/2018 | Gupta | E21B 47/001 |
| 2018/0240021 A1 | 8/2018 | Al-Harbi et al. | |
| 2018/0283169 A1* | 10/2018 | Oguche | E21B 47/12 |
| 2018/0284311 A1 | 10/2018 | Echeverria Ciaurri et al. | |
| 2019/0128110 A1* | 5/2019 | Spicer | G01V 9/00 |
| 2019/0128112 A1* | 5/2019 | Spicer | E21B 47/06 |

(Continued)

OTHER PUBLICATIONS

ISA/KR; Int'l Search Report and Written Opinion; PCT/US2020/053076; dated Jan. 12, 2021.

(Continued)

*Primary Examiner* — Alesa Allgood
*Assistant Examiner* — Byung Ro Lee
(74) *Attorney, Agent, or Firm* — Crowe & Dunlevy, P.C.

(57) ABSTRACT

A method is provided for monitoring the occurrence of pressure anomalies due to FDI in near real time during a hydraulic fracturing operation carried out on an active well that is located near one or more passive monitoring wells. The method includes the steps of obtaining raw pressure sensor data from the one or more passive monitoring wells, processing the pressure sensor data with the FDI analysis module, and determining if the rate of change for averaged pressure sensor data exceeds a preset threshold value that indicates the likelihood of a pressure anomaly. The methods can be configured to autonomously alert an operator of the likelihood of a pressure anomaly and with guidance on resolving the anomalies.

17 Claims, 4 Drawing Sheets

(56) References Cited

U.S. PATENT DOCUMENTS

2019/0153840 A1\* 5/2019 Bacon ............... E21B 43/26
2019/0234194 A1 8/2019 Dusterhoft et al.

OTHER PUBLICATIONS

Dongbo et al., Well Type and Pattern Optimization Technology for Large Scale Tight Sand Gas, Sulige Gas Field, NW China, Petroleum Exploration and Development; vol. 40, Issue 1, Feb. 2013.
Xu et al., Advanced Modeling of Production Induced Pressure Depletion and Well Spacing Impact on Infill Wells in Spraberry, Permian Basin, SPE Annual Technical Conference, Sep. 24, 2018.
Lehmann et al., Expanding Interpretation of Interwell Connectivity and Reservoir Complexity through Pressure Hit Analysis and Microseismic Integration; SPE Hydraulic Fracturing Conference, Feb. 1, 2016.
Klenner, Rob et al., Characterization of Fracture-Driven Interference and the Application of Machine Learning to Improve Operational Efficiency, Society of Professional Engineers (2018).

\* cited by examiner

REAL TIME MONITORING OF FRACTURE DRIVEN INTERFERENCE

RELATED APPLICATIONS

This application claims the benefit of U.S. Provisional Patent Application Ser. No. 62/907,016 filed Sep. 27, 2019 entitled, "Real Time Monitoring of Fracture Driven Interference," the disclosure of which is herein incorporated by reference.

FIELD OF THE INVENTION

This invention relates generally to the field of oil and gas production, and more particularly, but not by way of limitation, to an improved system and method for monitoring fracture driven interference (FDI) in near real time during a hydraulic fracturing operation.

BACKGROUND

Boreholes or wellbores are drilled into subsurface geologic formations that contain reservoirs of hydrocarbons to extract the hydrocarbons. Typically, a first set of wellbores are distributed over an area that is believed to define the boundaries of a reservoir block, or an operator's interest in the reservoir block. These existing or "parent" wellbores generally have a horizontal component that extends into the reservoir. A second set of wellbores may be drilled beside the parent wellbores to increase the production of hydrocarbons and fully exploit the reservoir asset. The second set of wellbores may be referred to as infill or "child" wellbores.

Hydraulic fracturing may be used to improve the recovery of hydrocarbons from the infill wells. "Frac hits" are a form of fracture-driven interference (FDI) that occur when infill wells communicate with existing wells during completion. The frac hits may negatively or positively affect production from the existing wells. In some cases, pressure communication between adjacent wellbores will result in an increase in pressure in the passive well, with a loss of fracturing fluid and proppant from the active well undergoing the hydraulic fracturing operation. This may lead to a decrease in production from the passive or offset well due to the increased presence of sand and proppant in the well or the active well due to under stimulation.

In the past, evidence of frac hits or other FDI events was primarily studied after the completion of the hydraulic fracturing operation, with the goal of better informing the design of future hydraulic fracturing operations and the placement of additional infill wells. Although generally effective at identifying problems that can be avoided in future completion and drilling operations, the detection of FDI events in near real time has been problematic for a variety of reasons. In particular, the data that tends to indicate the occurrence of a frac hit is both voluminous and distributed and difficult to consolidate for analysis in near real time. There is, therefore, a need for an improved system and method for detecting or predicting frac hits or other pressure anomalies in near real time. It is to this and other needs that the present disclosure is directed.

SUMMARY OF THE INVENTION

In one aspect, the present invention provides a method of monitoring the occurrence of pressure anomalies, which may be caused by, or indicative of FDI events, in near real time during a hydraulic fracturing operation carried out on an active well that is located near one or more passive monitoring wells. The method begins with the step of loading into a computer-implemented FDI analysis module operational inputs for the hydraulic fracturing operations. The method continues with the step of obtaining raw pressure sensor data from the one or more passive monitoring wells. Next, the method has the step of processing the pressure sensor data with the FDI analysis module, wherein the step of processing the pressure sensor data comprises calculating the rate of change for the raw pressure sensor data using a rolling average determined on a preset time interval. Next, the method moves to the step of determining if the rate of change for the averaged pressure sensor data exceeds a preset threshold value that indicates the likelihood of an FDI event. In this embodiment, the method concludes with the step of autonomously alerting an operator of the likelihood of an FDI event if the rate of change for the averaged pressure sensor data exceeds the present threshold valve.

In other embodiments, the method also includes the steps of applying a machine learning algorithm to determine a correlation between detected FDI events and a potential cause of the FDI event pulled from a database of raw or calculated hydraulic fracture design or subsurface features; and autonomously providing the operator with insights regarding the potential cause of the FDI event. In yet other embodiments, the method includes the additional step of autonomously providing the operator with guidance on resolving the FDI event. In other embodiments uncertainty for FDI detection is reduced through the integration of additional real time data sets (i.e. microseismic or fiber optics.) with the pressure monitoring data.

BRIEF DESCRIPTIONS OF THE DRAWINGS

WRITTEN DESCRIPTION

Figure 1:
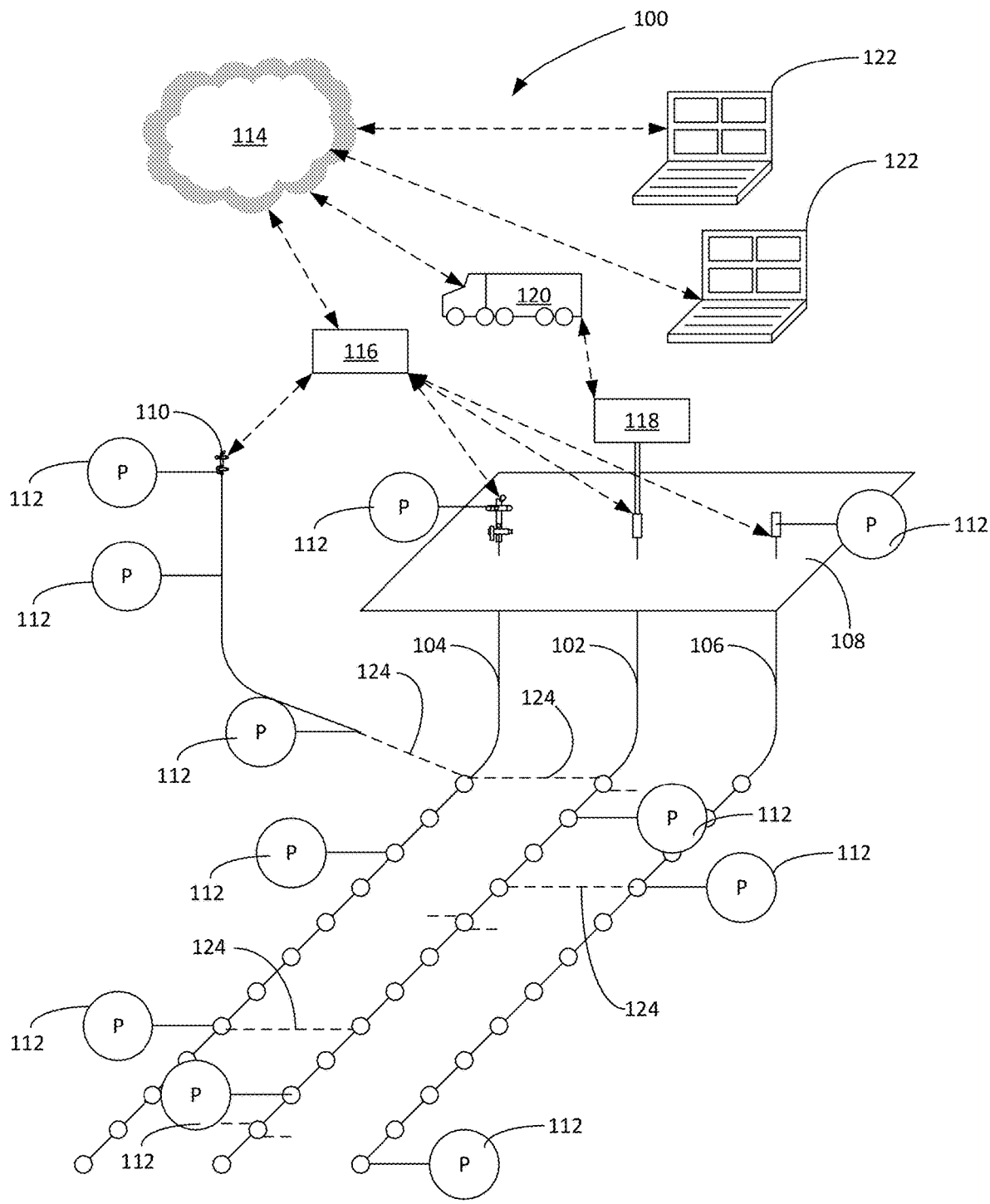
FIG. 1 is a depiction of a series of wells connected to an FDI monitoring system.

In accordance with an exemplary embodiment, FIG. 1 illustrates a fracture driven interference (FDI) monitoring system 100 deployed to monitor a hydraulic fracturing operation carried out on an active well 102. The active well 102 is an infill well that is positioned between a parent well 104 and a second infill well 106. The active well 102, the parent well 104 and the second infill well 106 extend from a common well pad 108. An offset well 110 is located nearby, but the offset well 110 is not located on the well pad 108. The parent well 104, the second infill well 106 and the offset well 110 can each be referred to as a "monitoring" well for the purposes of this disclosure.

It will be appreciated that the wells depicted in FIG. 1 are merely an example of how the FDI monitoring system 100 can be deployed, and that the systems and methods of the exemplary embodiments will find utility in other arrangements of closely-drilled wells. For example, the FDI monitoring system 100 can be used to actively monitor hydraulic fracturing operations carried out contemporaneously on multiple active wells 102. As used herein, the term "wells" collectively refers to the active well 102, the parent well 104, the second infill well 106 and the offset well 110.

Each well includes one or more pressure sensors 112 that measure the pressure at a specific location or region within the well. As illustrated in FIG. 1, each well is divided into a plurality of stages for hydraulic fracturing and production operations. The pressure sensors 112 are configured to report on a continuous or periodic basis the measured pressure to a computer-implemented analysis module 114 which also contains a database of field level data. In the exemplary embodiment depicted in FIG. 1, the analysis module 114 is configured as one or more remote computers that are accessed via a cloud computing network. A local communications system 116 may be used to gather and transfer the raw data produced by the pressure sensors 112 to the analysis module 114 using commercially available telecommunications networks and protocols (e.g., the ModBus protocol). In other embodiments, some or all of the pressure sensors 112 connect directly to the remote analysis module 114 through a direct network connection without an intervening location communications system 116.

Hydraulic fracturing equipment 118 is positioned near that active well 102 and controlled from a control station 120. In many applications, the control station 120 is a "frac van" that provides the operators with control and live information about the hydraulic fracturing operation. A number of performance criteria can be adjusted by the control station 120, including, for example, the makeup of the fracturing fluids and slurry, the types and quantities of sand or proppant injected into the active well 102, and the pumping pressures and flowrates achieved during the hydraulic fracturing operation. Each of these criteria is referred to herein as an "operational variable" that relates to the active hydraulic fracturing operation. The control station 120 is also connected to the analysis module 114, either directly or through the local telecommunications system 116.

Although the analysis module 114 is depicted as a cloud-computing resource in FIG. 1, in other embodiments the analysis module 114 is positioned locally in close proximity to the wells and control station 120. Positioning the analysis module 114 near the wells may reduce the latency between the time the live data is measured and the time the data is processed by the analysis module 114. In contrast, positioning the analysis module 114 in the cloud or at an offsite location may enable the use of more powerful computing systems. In yet other embodiments, some of the processing is carried out using local computers configured in an "edge-based" architecture near the wells, while the balance of the processing takes place at a remote location.

One or more workstations 122 are connected to the analysis module 114 either through a local direct connection or through a secure network connection. The workstations 122 are configured to run a computer-implemented FDI monitoring program that provides a user with real-time information produced by the analysis module 114. The workstations 122 can be positioned in different locations. In some embodiments, some of the workstations 122 are positioned in remote locations from the wells, while other workstations are positioned near the wells in the control station 120 or as part of a local edge-based computing system. As used herein, the term "workstations" includes personal computers, thin client computers, mobile phones, tablets, and other portable electronic computing devices.

As used herein, the term "FDI monitoring system 100" refers to the collection of pressure sensors 112 within the active well 102 and the monitoring wells 104, 106 and 110, the control station 120, the analysis module 114, the workstations 122 and any intervening data networks such as the local telecommunications system 116. It will be appreciated that the FDI monitoring system 100 may include additional sensors in or near the active well 102 and the monitoring wells 104, 106 and 110. Such additional sensors may include, for example, microseismic sensors, temperature sensors, proppant or fluid tracer detectors, acoustic sensors, and sensors located in artificial lift, completion, or other downhole equipment in the wells. The data measurement signal data provided by such additional sensors is transmitted to the analysis module 114 directly or through intervening data networks.

As explained below, the FDI monitoring system 100 is generally configured to monitor a hydraulic fracturing operation, aggregate pressure-based data from the active well 102 and the monitoring wells 104, 106 and 110, and alert the operator to FDI events 124 that represent an unintended communication of pressure 124 from the active well 102 to one of the monitoring wells 104, 106, and 110, as indicated in FIG. 1. By way of illustration, FIG. 1 indicates that one frac hit 124 occurred between active well 102 and second infill well 106, two frac hits 124 occurred between active well 102 and parent well 104, and one frac hit 124 occurred between active well 102 and offset well 110.

Before the hydraulic fracturing operation takes place, an operator of the FDI monitoring system 100 using the workstation 122 can connect the analysis module 114 to the control station 120 and to a selected number of the pressure sensors 112 in the active well 102 and the monitoring wells 104, 106 and 110. Once the hydraulic fracturing operation has been initiated, the analysis module 114 can poll the control station 120 and pressure sensors 112 on a continuous or periodic basis. In some embodiments, the analysis module 114 polls the pressure sensors on intervals of between once per second and once per every fifteen minutes. In an exemplary embodiment, the analysis module 114 pulls the pressure sensors 112 every thirty seconds. The raw data from the control station 120 and pressure sensors 112 is provided to the analysis module 114 for processing. As explained below, the analysis module 114 is generally configured to detect anomalies in the pressure measurements taken by the pressure sensors in the passive, monitoring wells 104, 106 and 110. In exemplary embodiments, the analysis module 114 invokes machine learning, physics, or statistical functions to detect FDI events based on pressure anomalies and to autonomously determine a causal relationship between the FDI events and one or more features of the hydraulic fracturing operation and the wells.

Figure 2:
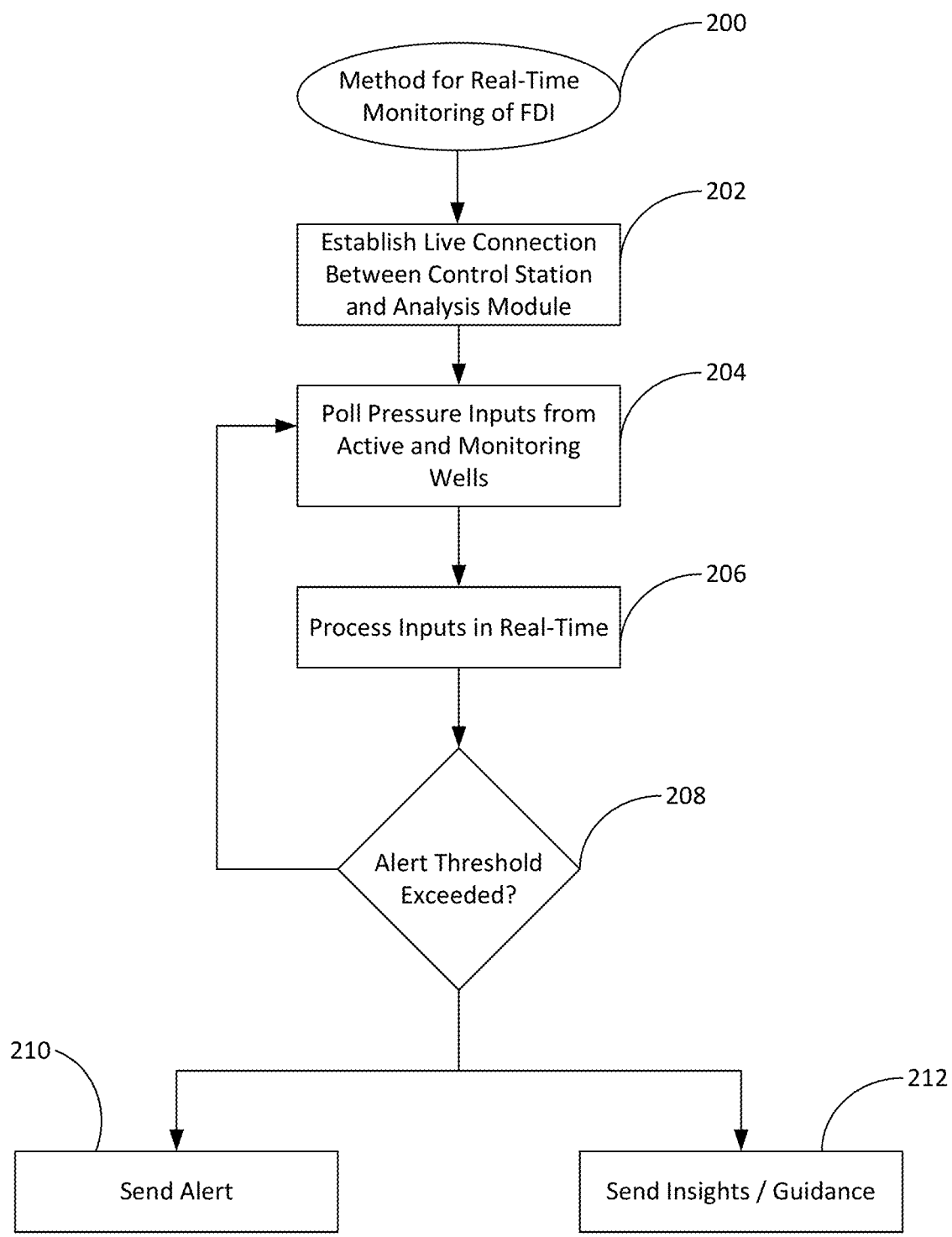
FIG. 2 is process flow diagram for a method of real-time monitoring of FDI.

Turning to FIG. 2, shown therein is a process flow diagram for an exemplary method 200 for the real-time monitoring of FDI events carried out with the FDI monitoring system 100. The method begins at step 202 when the control station 120 connects to the analysis module 114 to provide initial and updated data about the hydraulic fracturing or other completion operations. In some embodiments, the connection between the control station 120 and the analysis module 114 is configured such that the operational input and other data collected or produced by the control station 120 is streamed in near real time to the analysis module 114. In other embodiments, the analysis module 114 polls the control station 120 on a periodic basis for updated data about the hydraulic fracturing or other completion operations taking place on the wells.

Next, at step 204, the pressure sensors 112 and other sensors are polled on a specified time interval (e.g., every thirty seconds). In exemplary embodiments, the data from the pressure sensors 112 is aggregated at the analysis module 114 using a rolling average that updates once per second, or every time a new pressure reading is obtained. In other embodiments, the pressure data from the pressure sensors 112 is streamed in near real time—directly or indirectly—to the analysis module 114.

The method continues at step 206, where the data from the pressure sensors 112, the control station 120, and any additional sensors is processed on a continuous, real-time basis. The analysis module 114 is reviewing the data to determine if one or more of the pressure sensors 112 is signaling an unexpected increase in pressure (an anomaly), which could indicate pressure communication between the active well 102 undergoing the hydraulic fracturing operation and one of the monitoring wells 104, 106 and 110. Anomaly detection is a process that determines if an FDI event is occurring based on the raw data provided by the pressure sensors 112.

At step 208, the method 200 queries whether the analysis module 114 has detected an FDI event. If not, the method 200 returns to step 204 and the analysis module 114 continues to monitor the live, updated data presented by the pressure sensors 112. If, however, the analysis module 114 determines that the data suggest that an FDI event has occurred, is occurring, or is likely to occur in the near future, the method 200 progress to step 210 and an alert is automatically provided to the operator of the FDI monitoring system via an indication on the workstation 122, a text, email, alarm or telephone call.

In some embodiments, the steps of determining whether an FDI event is occurring (steps 206-208) include obtaining the raw data from one or more of the pressure sensors 112, calculating a slope for the change in the measured pressure using a rolling average over a present period (e.g., 1 minute), and determining if the slope (rate of change) of the pressure exceeds a preset threshold value. If so, the method moves from step 208 to step 210 to alert the operator of the detected FDI event or anomaly. As a non-limiting example, a significant pressure spike in the parent well 104 might indicate that a frac hit or other FDI event has occurred in which pressure from the active well 102 has been communicated (directly or indirectly) to the parent well 104.

In the event an FDI event is detected, the analysis module 114 can also be configured to autonomously provide the operator with insights and guidance regarding the cause of the FDI event at step 212. In some embodiments, the analysis module 114 is configured to correlate the aggregated pressure data, produce an analytical "signature" for the aggregated data, and compare the analytical signature with a library or database of established causes of FDI events to provide the operator with insights on why the FDI event is occurring (or likely to occur). In exemplary embodiments, the signature of the pressure data is obtained by determining the rate of change of the pressure data in near real time, using the rolling averages described herein.

Once the analysis module 114 has classified the FDI event, the analysis module can present the operator with suggested steps to mitigate the FDI event. Thus, if the analysis module 114 determines that the signature of the aggregated and processed pressure data correlates with a known signature of an FDI event based on regression based methods within a library or database accessible by the analysis module 114, the analysis module 114 can autonomously provide the operator with a suggestion for mitigating or avoiding the FDI event. The analysis module 114 may, for example, suggest that the operator reduce the pumping pressure in the active well 102 while temporarily closing in the parent well 104 to build backpressure to deter further encroachment of the pressure communication. The analysis module 114 can be configured to automatically update its library of correlations between unique pressure data signatures and confirmed FDI events to improve the quality of insights and guidance provided to the operator in the future.

A variety of aggregation and processing techniques can be implemented by the analysis module 114 to identify anomalies associated with frac hits and other FDI events. As noted above, the FDI monitoring system 100 is capable of applying machine learning alone or in combination with reduced order physics-based models to autonomously produce an explanation for why the FDI event occurred and provide guidance for mitigating the FDI event. The detection of anomalies and the implementation of machine learning for similar applications are discussed in co-pending U.S. patent application Ser. No. 16/433,953 filed Jun. 6, 2019, the disclosure of which is herein incorporated by reference as if fully set forth herein.

Although the exemplary embodiments are not so limited, in some cases the analysis module 114 employs random forest classifier functions in which multiple diverse decision trees are built and mapped against the data obtained from the pressure sensors 112. The random forest classifier functions can be used by the analysis module 114 to estimate the cause of the FDI event. In some embodiments, the analysis module is configured to utilize OOB-error ("out of bag" error) for estimating the prediction error of the random forest classifier solutions. It can be appreciated that the artificial intelligence and machine learning techniques discussed herein are not limited to any specific techniques, but may include any particular techniques known in the art of artificial intelligence and machine learning that would be appropriate for the applications discussed herein such as a random forest classifier or cluster analysis.

Turning to FIGS. 3-6, shown therein are exemplar screen shots illustrating certain visual outputs of the FDI monitoring system 100 on the workstations 122. At any time during the hydraulic fracturing operation, the operator can log into the workstation 122 to receive all of the relevant information about the status of the completion operations, or to review frac hit or other FDI events that have been identified by the analysis module 114 (step 208), even if the operator has not yet been alerted (step 210). For example, the operator can determine which stage of the active well 102 is currently being hydraulically fractured, how much sand has been pumped, and the current pressure at the stage being hydraulically fractured.

Figure 3:
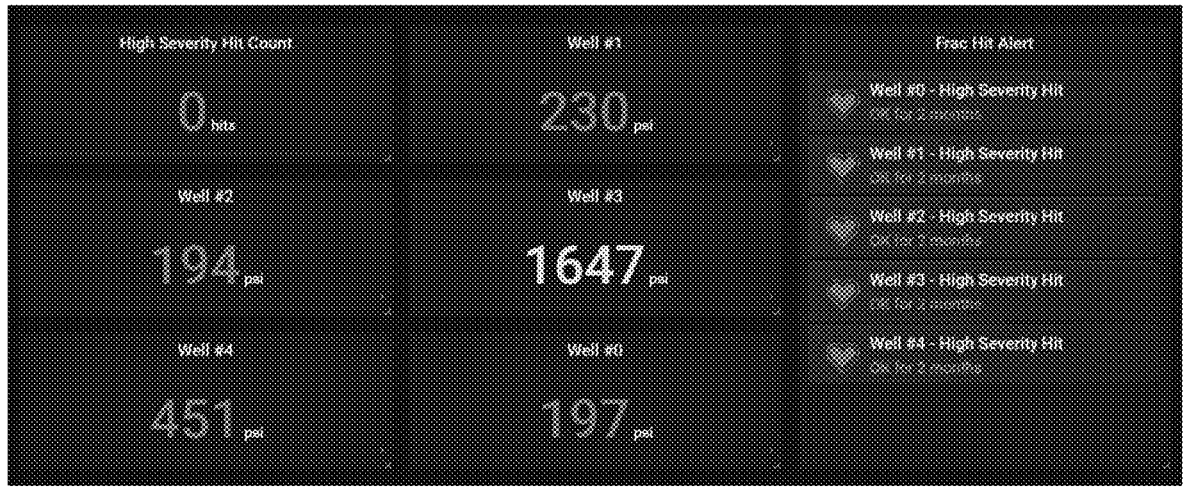
FIG. 3 is a screen shot of a first window of a graphic user interface from a computer-enabled monitoring program for the FDI monitoring system.
Figure 4:
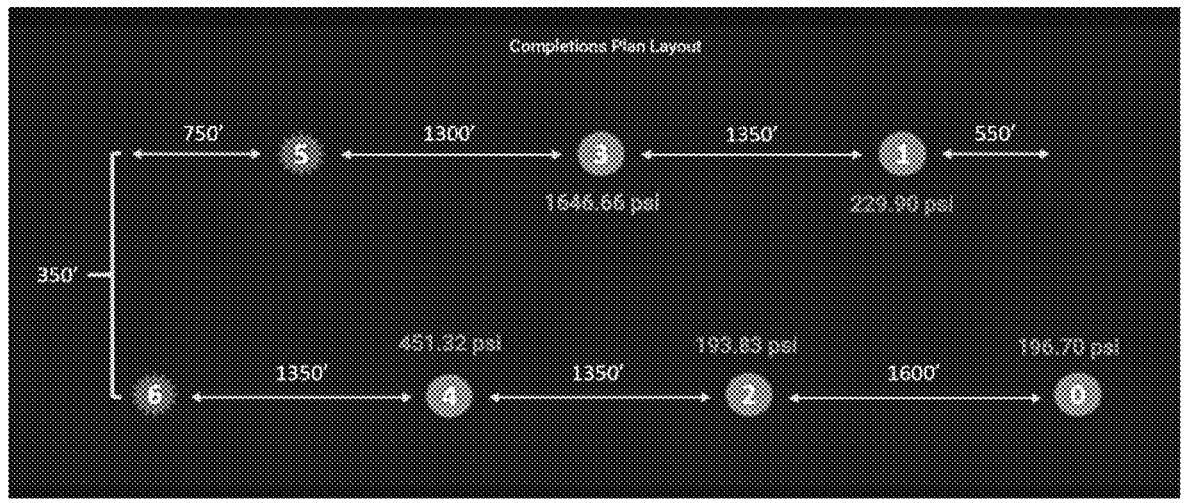
FIG. 4 is a screen shot of a second window of a graphic user interface from a computer-enabled monitoring program for the FDI monitoring system.

FIGS. 3 and 4, for example, provide an overview that summarizes the current state of the active wells 102 (wells 5 and 6 in FIG. 4) and the pressures recorded at the monitoring wells (wells 0-4 in FIG. 4). FIG. 3 provides an overview of the number of active frac hits, historical frac hits for the monitoring wells, and the current pressures recorded in the monitoring wells. Using this information, the operator can immediately determine that the pressure in well 3 (1646.66 psi) is significantly higher than the nearby wells. This suggests that there may be pressure communication between well 5 and well 3.

Figure 5:
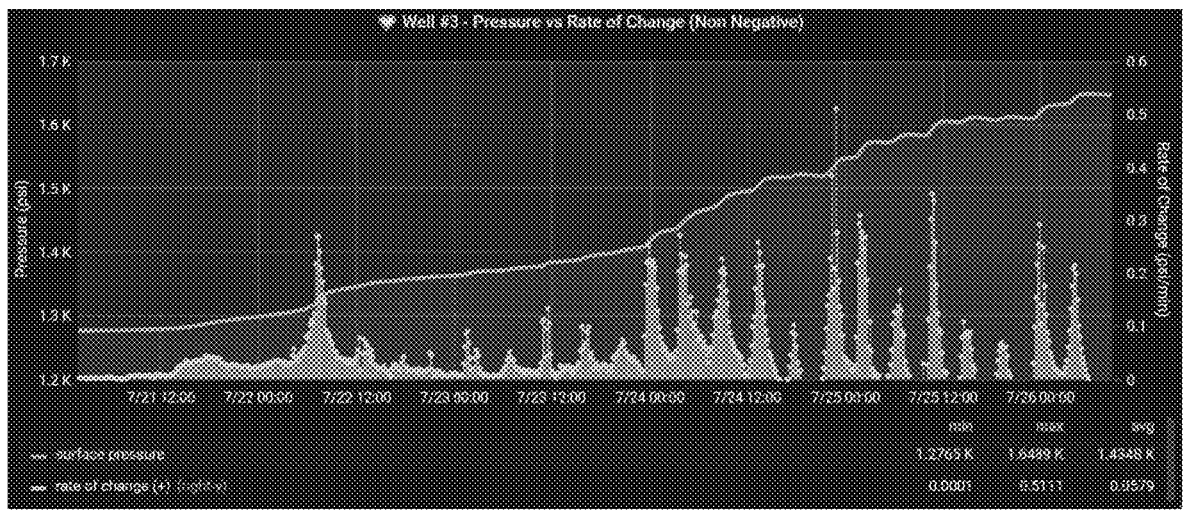
FIG. 5 is a screen shot of a third window of a graphic user interface from a computer-enabled monitoring program for the FDI monitoring system.
Figure 6:
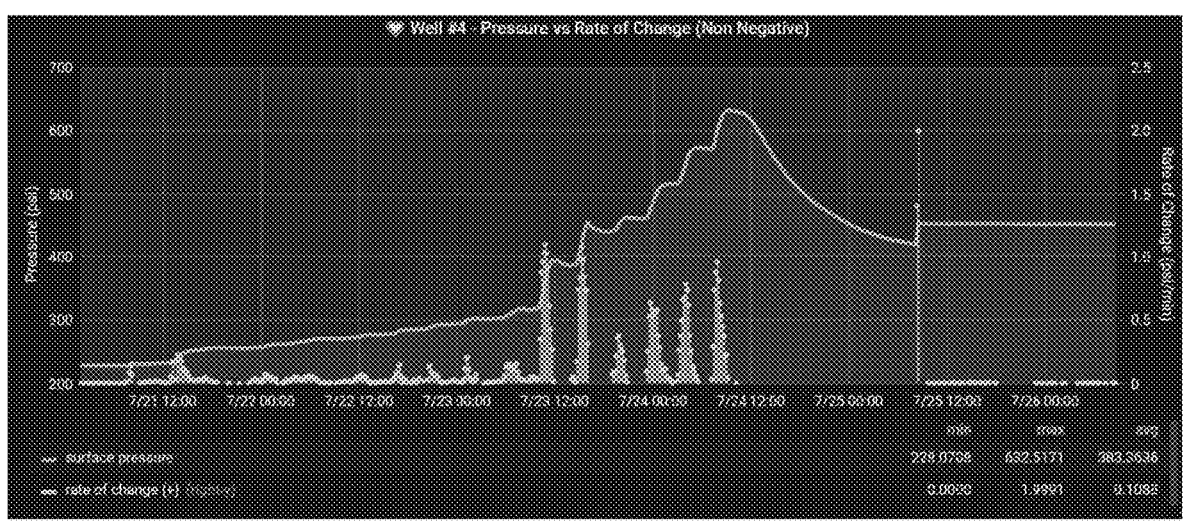
FIG. 6 is a screen shot of a fourth window of a graphic user interface from a computer-enabled monitoring program for the FDI monitoring system.

From this overview, the operator can move to the more detailed view of wells 3 and 4 depicted in the screenshots of FIGS. 5 and 6. In both FIGS. 5 and 6, the absolute pressure and the rate of change of the pressure are plotted against time. On these displays, only the positive rate of change is displayed, which represents an increasing pressure within the wells. Using this information, the operator can determine if the FDI event is ongoing and worsening (well 3 in FIG. 5) or if the FDI event has subsided and corrective action may not be necessary (well 4 in FIG. 6). The output from the analysis module 114 can be configured and customized by the operator to provide various levels of detail and layers of information.

Using this information, the operator can make an informed decision—in near real time—about whether to intervene in the hydraulic fracturing operation to reduce the impact of the FDI event. The output from the FDI monitoring system 100 can also be used in retrospective to modify the manner in which future infill wells are drilled or completed to minimize the risks of unwanted FDI events. In some embodiments, the FDI monitoring system 100 includes connections directly to the control station 120 such that the FDI monitoring can autonomously make changes to the characteristics of the ongoing hydraulic fracturing operation to mitigate the potential damage caused by unresolved FDI events. For example, the FDI monitoring system 100 can be configured to automatically reduce the pressure of the hydraulic fracturing operation in the event that a severe FDI event is detected and associated with an excessive pressure condition.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A method of monitoring the occurrence of pressure anomalies in near real time during a hydraulic fracturing operation carried out on a child or infill well that is located near one or more passive or parent monitoring wells, the method comprising the steps of:
    streaming live completion and operational data for the hydraulic fracturing operation to a computer-implemented pressure anomaly analysis module;
    obtaining raw pressure sensor data from the one or more passive monitoring wells;
    presenting the raw pressure sensor data to the computer-implemented pressure anomaly analysis module;
    processing the raw pressure sensor data with the pressure anomaly analysis module,
    wherein the step of processing the raw pressure sensor data comprises:
        determining a rolling average for the raw pressure sensor data;
        calculating a slope for the change in the rolling average for the raw pressure sensor data over a preset period; and
        determining the rate of change for the raw pressure sensor data over the preset period based on the slope calculated for the change in the raw pressure sensor data;
    determining if a fracture driven interference (FDI) event has occurred based on whether the rate of change for the raw pressure sensor data exceeds a preset threshold value that indicates the likelihood of a pressure anomaly;
    alerting an operator of the likelihood of the FDI event if the rate of change for the raw pressure sensor data exceeds the preset threshold value;
    producing an analytical signature based on the rolling average for the raw pressure sensor data;
    comparing the analytical signature against a library of established causes of FDI events; and
    autonomously providing the operator with information about the potential cause of the FDI event based on the comparison of the analytical signature and the library of established causes of FDI events.

2. The method of claim 1, wherein the step of comparing the analytical signature against a library of established causes of FDI events further comprises the step of:
    applying a machine learning algorithm to the raw pressure sensor data to autonomously determine a causal relationship between the FDI event and one or more features of the hydraulic fracturing operation.

3. The method of claim 1, further comprising the step of autonomously reducing the pressure of the existing hydraulic fracturing operation to mitigate the potential damage of the FDI event.

4. The method of claim 2, wherein the step of applying a machine learning algorithm further comprises correlating the raw pressure sensor data with a database of pressure anomalies that have been classified by pressure sensor data.

5. The method of claim 1, wherein the step of processing the raw pressure sensor data comprises calculating the rate of change for the raw pressure sensor data using a rolling average determined on a preset time interval.

6. The method of claim 1, wherein the step of presenting the raw pressure sensor data to the computer-implemented pressure anomaly analysis module comprises polling the pressure sensors for new data on a periodic basis.

7. The method of claim 1, wherein the step of presenting the raw pressure sensor data to the computer-implemented pressure anomaly analysis module comprises polling the pressure sensors for new data on a periodic basis that occurs more than once per minute.

8. The method of claim 1, wherein the step of presenting the raw pressure sensor data to the computer-implemented pressure anomaly analysis module comprises polling the pressure sensors for new data on a periodic basis that occurs at a frequency of less than once per second and more than once per minute.

9. The method of claim 1, wherein the step of presenting the raw pressure sensor data to the computer-implemented pressure anomaly analysis module comprises polling the pressure sensors for new data on a periodic basis that occurs at a frequency of more than once per second.

10. The method of claim 1, wherein the step of presenting the raw pressure sensor data to the computer-implemented pressure anomaly analysis module comprises receiving updated raw pressure data from the pressure sensors through a live streaming connection in near real time.

11. A method of monitoring the occurrence of pressure anomalies in near real time during a hydraulic fracturing operation carried out on an active well that is located near one or more passive monitoring wells, the method comprising the steps of:

streaming live completion and operational data for the hydraulic fracturing operation to a computer-implemented FDI analysis module;

obtaining raw pressure sensor data from the one or more passive monitoring wells;

presenting the raw pressure sensor data to the computer-implemented FDI analysis module;

processing the pressure sensor data with the FDI analysis module, wherein the step of processing the pressure sensor data comprises:

calculating a slope for the change in the raw pressure sensor data using a rolling average determined on a preset time interval; and finding a rate of change for the averaged pressure sensor data based on the slope calculated for the change in averaged pressure sensor data over the preset time interval;

determining if the rate of change for the averaged pressure sensor data exceeds a preset threshold value that indicates the likelihood of an FDI event;

producing an analytical signature based on the rolling average for the raw pressure data;

comparing the analytical signature against a library of established causes of FDI events; and autonomously providing the operator with insights regarding the potential cause of the FDI event.

12. The method of claim 11, further comprising the step of applying a machine learning algorithm to the raw pressure sensor data to determine a correlation between the raw pressure sensor data and a potential cause of the FDI event.

13. The method of claim 12, further comprising the step of comparing the output from the machine learning algorithm against additional analytical models that are not based on raw pressure sensor data.

14. The method of claim 11, wherein the step of obtaining raw pressure sensor data from the one or more passive monitoring well comprises obtaining raw pressure sensor data from the one or more passive monitoring wells while the one or more passive monitoring wells are undergoing a fluid injection process.

15. The method of claim 11, wherein the step of presenting the raw pressure sensor data to the computer-implemented FDI analysis module comprises receiving updated raw pressure data from the pressure sensors through a live streaming connection in near real time.

16. A method of monitoring the occurrence of FDI events in near real time during a hydraulic fracturing operation carried out on an active well that is located near one or more passive monitoring wells, the method comprising the steps of:

obtaining raw pressure sensor data from the one or more passive monitoring wells; presenting the raw pressure sensor data to a computer-implemented FDI analysis module within an FDI monitoring system;

processing the pressure sensor data with the FDI analysis module to determine the likelihood of an FDI event, wherein the step of processing sensor data with the FDI analysis module comprises;

calculating a slope for the change in the raw pressure sensor data using a rolling average determined over a preset time interval; and finding a rate of change for the averaged pressure sensor data based on the slope calculated for the change in averaged pressure sensor data;

producing an analytical signature based on the rolling average for the raw pressure data;

comparing the analytical signature against a library of established causes of FDI events; and autonomously adjusting the hydraulic fracturing operation with the FDI monitoring system based on the likelihood of an FDI event determined by the FDI analysis module.

17. The method of claim 16, wherein the step of processing the pressure sensor data is carried out in near real time as the raw pressure sensor data is presented to the computer-implemented FDI analysis module.

\* \* \* \* \*